United States Patent
Kondo et al.

(10) Patent No.: US 7,743,883 B2
(45) Date of Patent: Jun. 29, 2010

(54) NOISE ELIMINATOR FOR FUEL CELL

(75) Inventors: Toshiyuki Kondo, Chiryu (JP);
Kazunori Yanagihara, Aichi-ken (JP);
Hideaki Taniguchi, Seto (JP); Takashi Kato, Nissin (JP); Kiyohiko Nagae, Toki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/885,885

(22) PCT Filed: Mar. 9, 2006

(86) PCT No.: PCT/JP2006/305182
§ 371 (c)(1),
(2), (4) Date: Sep. 7, 2007

(87) PCT Pub. No.: WO2006/100990
PCT Pub. Date: Sep. 28, 2006

(65) Prior Publication Data
US 2008/0185218 A1 Aug. 7, 2008

(30) Foreign Application Priority Data
Mar. 24, 2005 (JP) .............................. 2005-085174

(51) Int. Cl.
*F01N 1/04* (2006.01)
(52) U.S. Cl. .................. 181/244; 181/250; 181/252
(58) Field of Classification Search ............. 181/227, 181/228, 244, 247, 248, 249, 250, 251, 252
See application file for complete search history.

(56) References Cited

U.S. PATENT DOCUMENTS

| | | | |
|---|---|---|---|
| 2,808,896 A * | 10/1957 | Wilman | 181/228 |
| 4,393,956 A * | 7/1983 | Tsukui et al. | 181/265 |
| 4,513,841 A | 4/1985 | Shimoji et al. | |
| 4,842,096 A * | 6/1989 | Fujitsubo | 181/252 |
| 5,340,952 A * | 8/1994 | Takiguchi | 181/282 |
| 6,729,354 B2 | 5/2004 | Ishizu et al. | |
| 2004/0149515 A1 | 8/2004 | Toyoshima | |

FOREIGN PATENT DOCUMENTS

DE 32 41 887 C1 7/1984

(Continued)

*Primary Examiner*—Jeffrey Donels
*Assistant Examiner*—Jeremy Luks
(74) *Attorney, Agent, or Firm*—Kenyon & Kenyon LLP (57) ABSTRACT

A noise eliminator for a fuel cell, where an outer shell has a reception section in which a sound absorption material is placed between the outer shell and an inner pipe and has a water discharge section that is positioned so as to face a lower portion in the vertical direction of the inner pipe and in which the sound absorption material is not placed between the outer shell and the inner pipe. The water discharge section receives water flowing into the outer shell and allows the water to flow to the outside of the outer shell. Although the water discharge section receives water flowing into the outer shell, the sound absorption material inside the noise eliminator does not absorb the water from the water discharge section and does not contain it because there is no sound absorption material in the water discharge section.

11 Claims, 9 Drawing Sheets

FOREIGN PATENT DOCUMENTS

| | | |
|---|---|---|
| JP | 62-036212 U | 3/1987 |
| JP | 1-71122 | 5/1989 |
| JP | 01-071122 U | 5/1989 |
| JP | 2-069011 U | 5/1990 |
| JP | 02-069011 U | 5/1990 |
| JP | 02173313 A * | 7/1990 |
| JP | 8-334018 A | 12/1996 |
| JP | 2002-206413 A | 7/2002 |
| JP | 2002-213238 A | 7/2002 |
| JP | 2002-227642 A | 8/2002 |
| JP | 2004-039462 A | 2/2004 |
| JP | 2004-139787 A | 5/2004 |
| JP | 2004-199971 A | 7/2004 |
| JP | 2004-225595 A | 8/2004 |
| JP | 2005-016494 A | 1/2005 |
| KR | 10-2004-0050272 | 6/2004 |

* cited by examiner

NOISE ELIMINATOR FOR FUEL CELL

This is a 371 national phase application of PCT/JP2006/305182 filed 9 Mar. 2006, claiming priority to Japanese Patent Application No. 2005-085174 filed 24 Mar. 2005, the contents of which are incorporated herein by reference.

TECHNICAL FIELD

The present invention relates to a noise eliminator provided in an exhaust system of a fuel cell, and particularly to a structure for discharging water generated by condensation of moisture contained in exhaust to the outside of the noise eliminator.

BACKGROUND ART

In a fuel cell, a fuel gas supplied to an anode and an oxidizing gas supplied to a cathode react to generate electricity in an electrolyte film, and at the same time as this, moisture is generated. The generated moisture, together with the fuel gas and the oxidizing gas not used for the reaction, is discharged as the exhaust of the fuel cell from a specified exhaust system connected to the fuel cell. In the exhaust system as stated above, there is a case where airflow noise of a relatively high frequency, such as 500 to 2000 Hz, is generated. In order to reduce this airflow noise, a sound absorption type noise eliminator, internally filled with a sound absorption material (sound elimination material), such as glass wool, is often mounted in an exhaust system of a fuel cell vehicle or the like.

Figure 7:
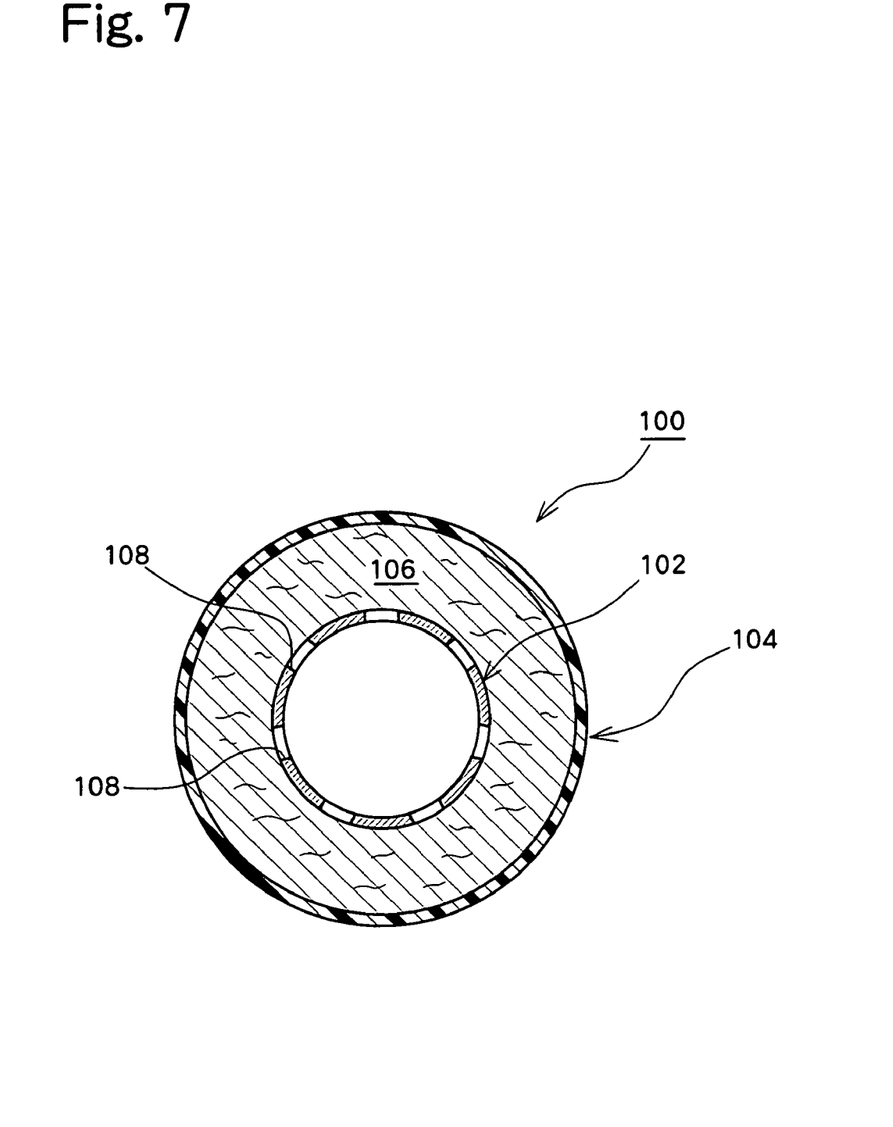
FIG. 7 is a cross-sectional view of a sound absorption type noise eliminator of the related art.

The noise eliminator as stated above includes, for example, a sectional structure shown in FIG. 7. This noise eliminator 100 includes an inner pipe 102 through which exhaust from the fuel cell flows, and an outer shell surrounding this, and a sound absorption material 106 such as glass wool is filled between the inner pipe 102 and the outer shell 104. Plural sound transmitting holes 108 are formed in the peripheral wall of the inner pile 102. The sound radiated from the sound transmitting holes 108 to the sound absorption material 106 repeats scattering and interference in the sound absorption material 106, and is attenuated, so that the sound is absorbed by the sound absorption material 106.

A large amount of generated moisture is contained in the exhaust of the fuel cell. There is a case where this moisture is condensed in the inside of the noise eliminator and is dropped or water condensed at the exhaust system upstream side flows into the noise eliminator, and the water is collected in a lower part (hereinafter referred to as a bottom section) in the vertical direction of the noise eliminator. In this case, there is a case where the sound absorption material filled on the bottom section of the noise eliminator adsorbs and holds the water (hereinafter referred to as "contains water"), so that the specified sound absorption performance cannot be exhibited, and the noise eliminating performance of the noise eliminator is lowered.

Figure 8:
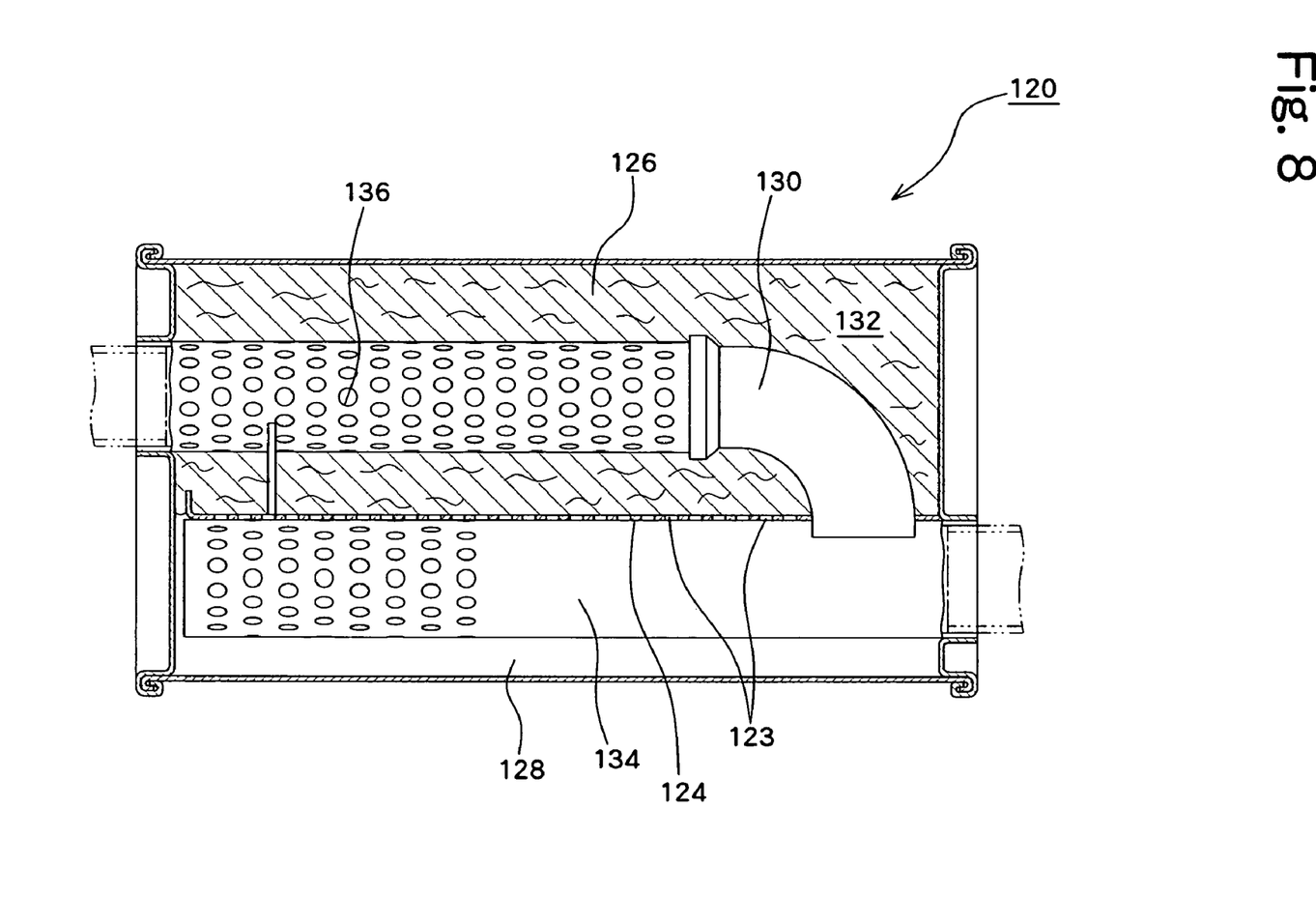
FIG. 8 is a longitudinal sectional view of a noise eliminator disclosed in JP-A-2002-206413.

As prior art to deal with this, for example, JP-A-2002-206413 proposes a noise eliminator 120. As shown in FIG. 8, in the noise eliminator 120, the inside of the noise eliminator 120 is divided up and down in the vertical direction by a partition plate 124 having a continuous hole 122, so that a sound absorption chamber 126 and an expansion chamber 128 are formed. An inner pipe 130 having sound transmitting holes 136 is disposed in the inside of the sound absorption chamber 126, and a sound absorption material is filled so as to surround the inner pipe 130. With this structure, even if the sound absorption material 126 below the inner pipe 130 in the vertical direction contains water, the water can be dropped to the expansion chamber 128 through the continuous hole 122 of the partition plate 124. The water dropped to the expansion chamber 128 is sequentially discharged to the outside of the noise eliminator 120 through a conduit pipe 134.

However, in the noise eliminator shown in FIG. 8, although the water is dropped to the expansion chamber from the sound absorption material at the lower side of the sound absorption chamber, there is a problem that a region where the sound absorption material contains water becomes wide. The water contained in the sound absorption material includes water flowing in from the exhaust system upstream side along the inner wall of the inner pipe, and water condensed on the inner wall of the inner pipe and dropped. The inflow water as stated above is dropped through the sound transmitting holes of the inner pipe and is contained especially in the sound absorption material existing below the inner pipe. The sound absorption material containing water is fibers having a small diameter, such as glass wool, and a gap between the fibers is also usually small. Since the capillarity occurs in the fibers as stated above, there is a case where water is drawn and contained in not only the sound absorption material below and around the inner pipe, but also the sound absorption material above the inner pipe.

As stated above, in the noise eliminator shown in FIG. 8, by the exhaust flow flowing in from the sound transmitting holes of the inner pipe, water can be dropped to the expansion chamber to some extent from the sound absorption material containing water, however, since the region containing water is wide in the filled sound absorption material, it has been difficult for the sound absorption material to exhibit the specified sound absorption performance.

Then, the invention has an object to provide a noise eliminator having such a structure that in a sound absorption material existing in the inside, a region containing water becomes narrow.

DISCLOSURE OF THE INVENTION

In a noise eliminator for a fuel cell according to the invention, an outer shell includes a reception section in which a sound absorption material is placed between the outer shell and an inner pipe, and a water discharge section which is positioned to face a lower portion in the vertical direction of the inner pipe and in which the sound absorption material is not placed in the outer shell and the inner pipe, and this water discharge section is formed to receive water flowing into the outer shell and allows the water to flow to the outside of the outer shell. The sound absorption material is not placed in a space between the lower portion of the inner pipe and the water discharge section facing this. Accordingly, even if the water discharge section receives the water flowing into the outer shell, since the sound absorption material is not placed in the water discharge section, the sound absorption material inside the noise eliminator does not absorb the water from the water discharge section and does not contain it.

Preferably, the inner pipe is disposed relative to the outer shell so that a distance between the peripheral wall of the inner pipe and the reception section of the outer shell in vertical direction is larger than a distance between the peripheral wall and the water discharge section of the outer shell. In this way, a relatively wide space for placing the sound absorption material can be ensured between the upper side of the inner pipe in the vertical direction and the reception section of the outer shell. While the space having no sound absorption material and for receiving water is ensured between the water discharge section and the inner pipe, a relatively large amount of the sound absorption material can be placed on the upper side of the inner pipe.

Preferably, the water discharge section of the outer shell is formed to have a substantially U-shaped section protruding toward the outside of the outer shell. In this way, the water discharge section is deeper to the lower side in the vertical direction compared with the part of the outer shell adjacent thereto. Accordingly, the water discharge section can store more water without allowing the water to come in contact with the sound absorption material existing at the periphery thereof.

Preferably, a sound transmitting hole is formed in an upper portion of the inner pipe peripheral wall, and is not formed in a lower portion. Accordingly, water flowing from the exhaust system upstream side along the inner pipe lower portion does not enter the outer shell from the inner pipe, but is directly discharged to the exhaust system downstream side.

Preferably, the sound transmitting hole is formed in a portion of the inner pipe peripheral wall facing a sound absorption chamber formed between the outer shell reception section and the inner pipe.

Preferably, the inner pipe is attached at an angle to become low in the exhaust system downstream direction. In this way, the water dropped to the lower portion of the inner pipe and the outer shell water discharge section can be made to flow smoothly in the exhaust system downstream direction along these.

Preferably, an attachment angle of the inner pipe is set to 5 to 10°. In this way, without impairing the vehicle mounting property of the noise eliminator, water can be discharged from the lower portion of the inner pipe and the water discharge section of the outer shell.

Preferably, a water discharge hole to connect a space between the outer shell water discharge section and the inner pipe and the inside of the inner pipe is formed in the lower portion of the inner pipe at the exhaust system downstream side. The water flowing in the exhaust system downstream direction along the water discharge section is made to flow into the downstream side of the inner pipe from the water discharge hole, and can, together with the water flowing along the inner pipe, be discharged to the outside of the noise eliminator.

Preferably, a buffer member is provided between the inner pipe and the outer shell to prevent contact therebetween. In this way, in the case where the inner pipe slides in the outer shell, it is possible to prevent the water discharge section of the outer shell from coming in direct contact with the inner pipe to generate an abnormal noise.

Preferably, the buffer member protrudes from the lower side in the vertical direction of the inner pipe peripheral wall, and is extended along the axial direction of the inner pipe. The buffer member can prevent the contact between the water discharge section and the inner pipe without preventing flow of water along the water discharge section of the outer shell.

Preferably, the outer shell is made of resin and can be integrally molded. Since the outer shell is constructed without using joining such as welding, it is possible to prevent the inner fluid from leaking due to separation or the like of the joined portion.

Preferably, in the outer shell, a pipe receiving section into which the inner pipe can be press-inserted is formed on at least one of the exhaust system upstream side and downstream side, an end of the inner pipe is press-inserted in the pipe receiving section, and the outer shell and the inner pipe are fixed. In this way, the inner pipe can be fixed to the outer shell without using a relatively high cost fixing method such as welding.

Preferably, the pipe reception section is formed on one of the exhaust system upstream side and downstream side of the outer shell, and in the case where one end of the inner pipe is press-inserted into and fixed to this, the other end of the inner pipe is slidably fitted in the outer shell or a member fixed to the outer shell. In this way, in the case where the outer shell made of resin and the inner pipe made of stainless steel are respectively expanded with different thermal expansion coefficients, the difference in the thermal expansion coefficient between the outer shell and the inner pipe can be absorbed.

Preferably, there is provided a connection pipe to connect the outer shell and the other end of the inner pipe, and the connection pipe includes a large diameter section that has a connection pipe connecting the outer shell and the other end of the inner pipe and is press-inserted into and fixed to the outer shell, and a small diameter section that is slidably fitted in the other end of the inner pipe. After the one end of the inner piper is press-inserted into and fixed to the outer shell, the small diameter section of the connection pipe is slidably fitted in the other end of the inner pipe, and the large diameter section of the connection pipe is press-inserted into and fixed to the outer shell. As a result, the noise eliminator capable of absorbing the difference in thermal expansion between the outer shell and the inner pipe can be easily realized.

BEST MODE FOR CARRYING OUT THE INVENTION

Hereinafter, an embodiment of the invention will be described in detail with reference to the drawings.

Figure 9:
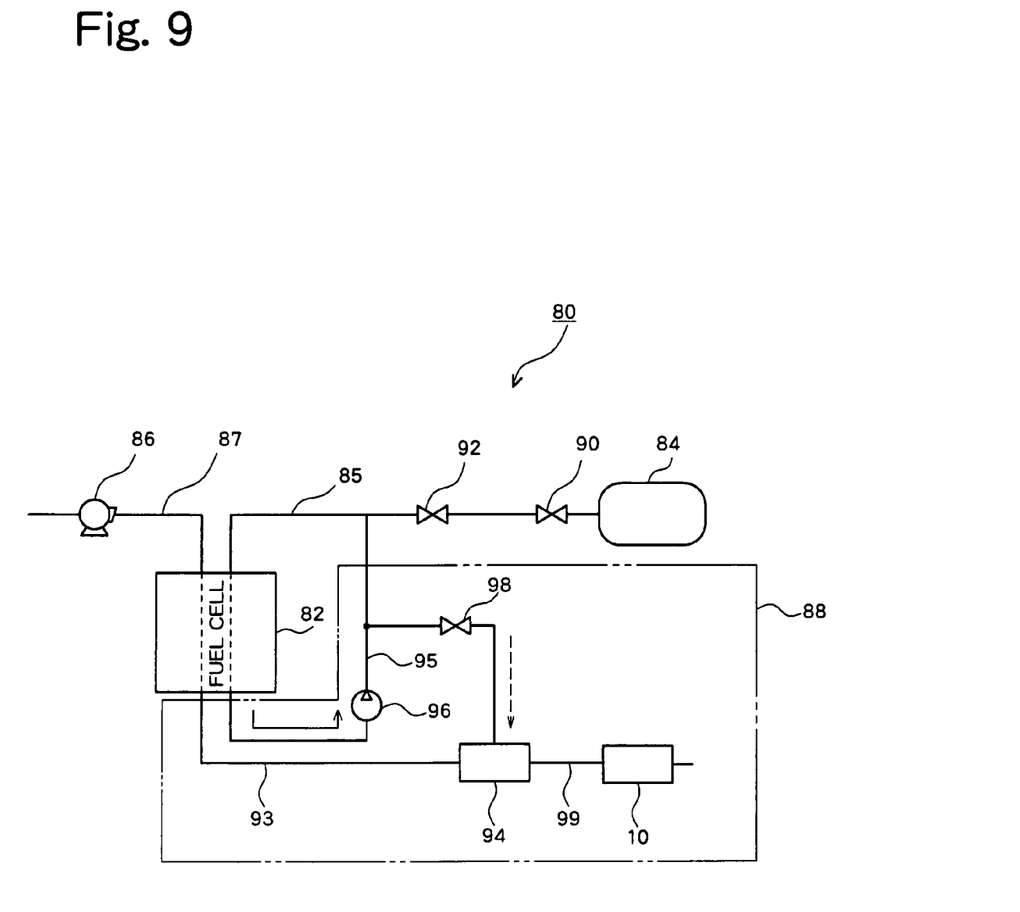
FIG. 9 is a view showing a rough structure of a fuel cell system.

First, a rough structure of an exhaust system of a fuel cell system in which a noise eliminator 10 of the embodiment is provided will be described with reference to FIG. 9. FIG. 9 shows the rough structure of the fuel cell system. A fuel cell system 80 includes a fuel cell 82, a hydrogen tank 84 to supply a hydrogen gas to the fuel cell 82, a blower 86 to supply an oxidizing gas to the fuel cell 82, and an exhaust system 88 (indicated by a two-dot chain line in FIG. 9) to discharge exhaust from the fuel cell 82.

The hydrogen tank 84 is connected to the fuel cell 82 through a fuel gas supply path 85, and the flow rate of the hydrogen gas (fuel gas) stored in the hydrogen tank 84 is adjusted by a regulator 90 and the gas is supplied to the fuel cell 82 through a control valve 92. On the other hand, the blower 86 is connected to the fuel cell 82 through an oxidizing gas supply path 87, and the air (oxidizing gas) is supplied to the fuel cell 82. In the fuel cell 82, the supplied hydrogen gas and air react with each other to generate electrical energy, and at the same time, moisture is generated.

The hydrogen gas not used for the reaction (hereinafter referred to as anode exhaust gas) and the air not used for the reaction (hereinafter referred to as cathode exhaust gas) are discharged to the exhaust system 88 from the fuel cell 82. The anode exhaust gas and the cathode exhaust gas contain the moisture generated by the reaction. The cathode exhaust gas flows into a diluting unit 94 through a cathode exhaust gas path 93. On the other hand, the anode exhaust gas passes through an anode exhaust gas path 95 and flows into the diluting unit 94 through a circulation pump 96 and a purge valve 98. The anode exhaust gas and the cathode exhaust gas join together in the diluting unit 94 and flow, as exhaust containing moisture, into a noise eliminator 10 through a pipe 99.

Figure 1:
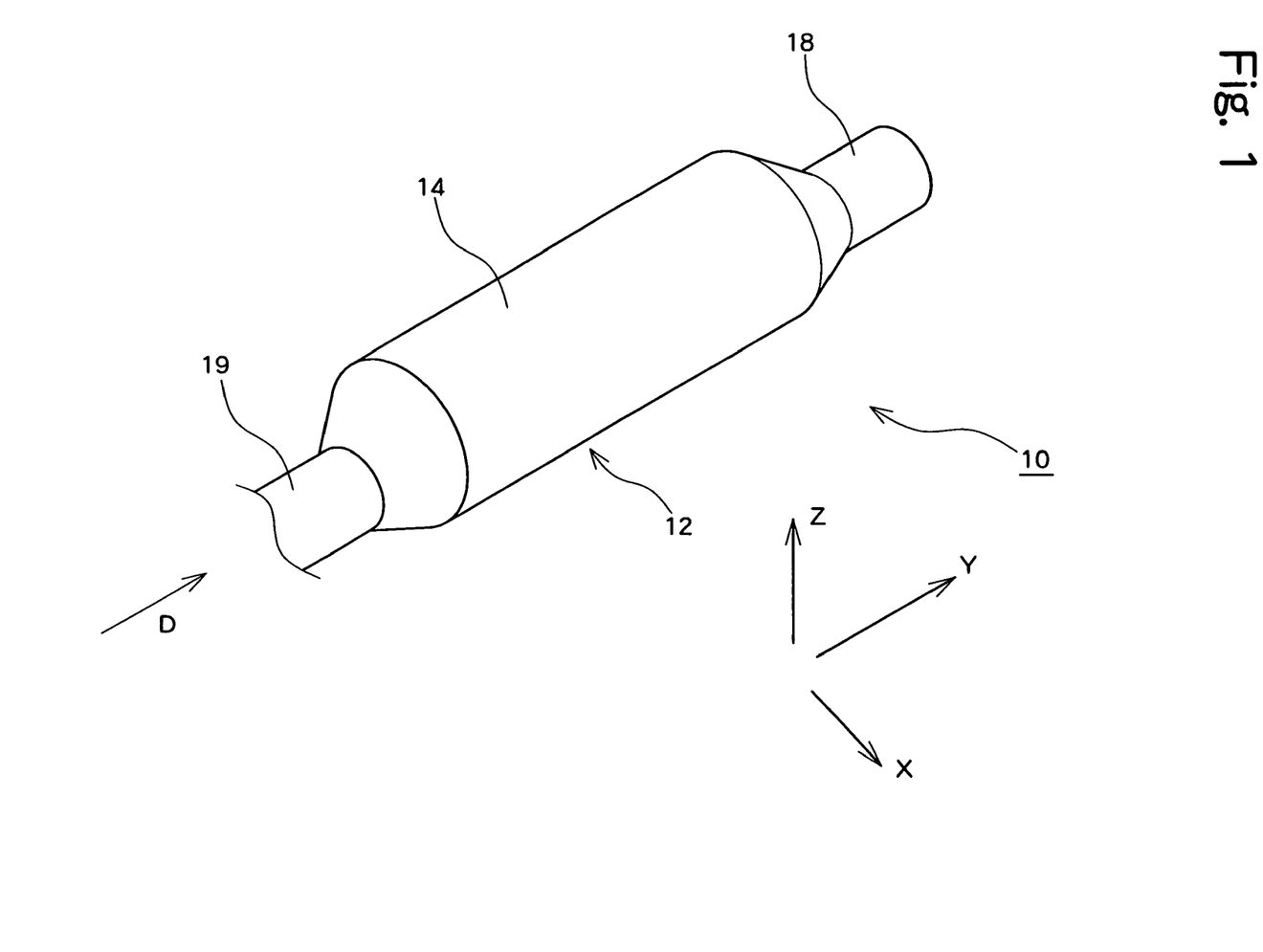
FIG. 1 is a perspective view showing a rough structure of a noise eliminator according to an embodiment.
Figure 2:
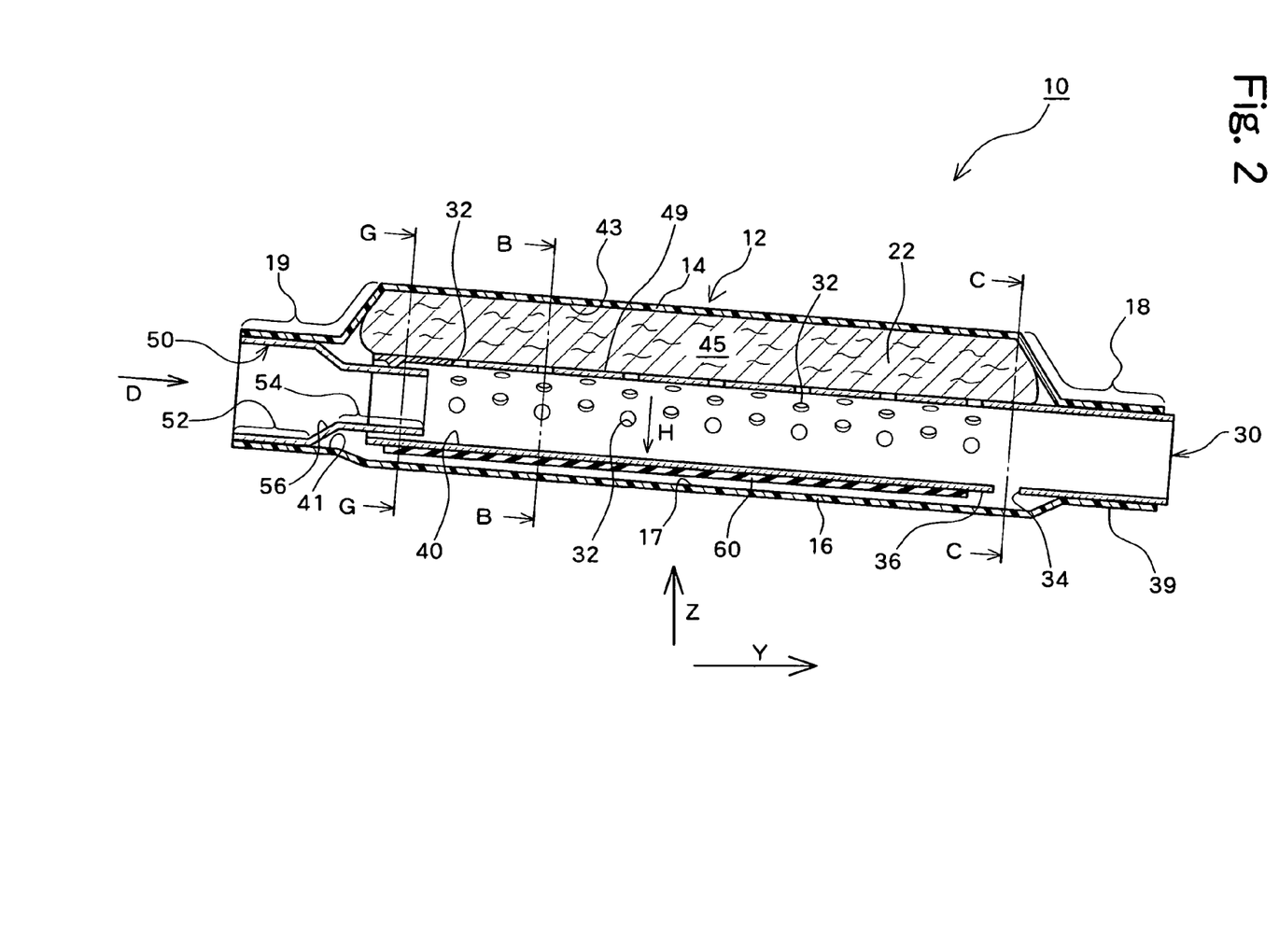
FIG. 2 is a longitudinal sectional view of the noise eliminator according to the embodiment.

Next, the outline of the noise eliminator 10 of the embodiment will be described with reference to FIG. 1 and FIG. 2. FIG. 1 shows a rough structure of the noise eliminator 10, and FIG. 2 is a longitudinal sectional view of the noise eliminator in the longitudinal direction indicated by an arrow Y in FIG. 1. The noise eliminator 10 is mounted in the exhaust system of the fuel cell system. In the case where the noise eliminator 10 is applied to a fuel-cell vehicle, it is hung by a bracket or the like and mounted on the under floor at the rear of the vehicle. Incidentally, in the drawing, an arrow X indicates the left of the vehicle, the arrow Y indicates the rear of the vehicle, and an arrow Z indicates the upside of the vehicle. As shown in FIG. 2, the noise eliminator 10 is mounted to have an inclination angle of 5 to 10° so that it becomes low in an exhaust system downstream direction (direction indicated by the arrow Y) with respect to the vehicle horizontal plane including the arrows X and Y.

From the fuel cell (not shown), the air not used for the reaction and the exhaust containing the moisture (water vapor) generated by the fuel cell are discharged from the specified exhaust system. The noise eliminator 10 is provided at the end of the exhaust system, and the exhaust containing the moisture and water generated by condensation of the moisture in the exhaust in the inside of the exhaust system upstream relative to the noise eliminator 10 flows into the noise eliminator 10 from the exhaust system upstream side (side indicated by an arrow D in FIG. 1).

Figure 3:
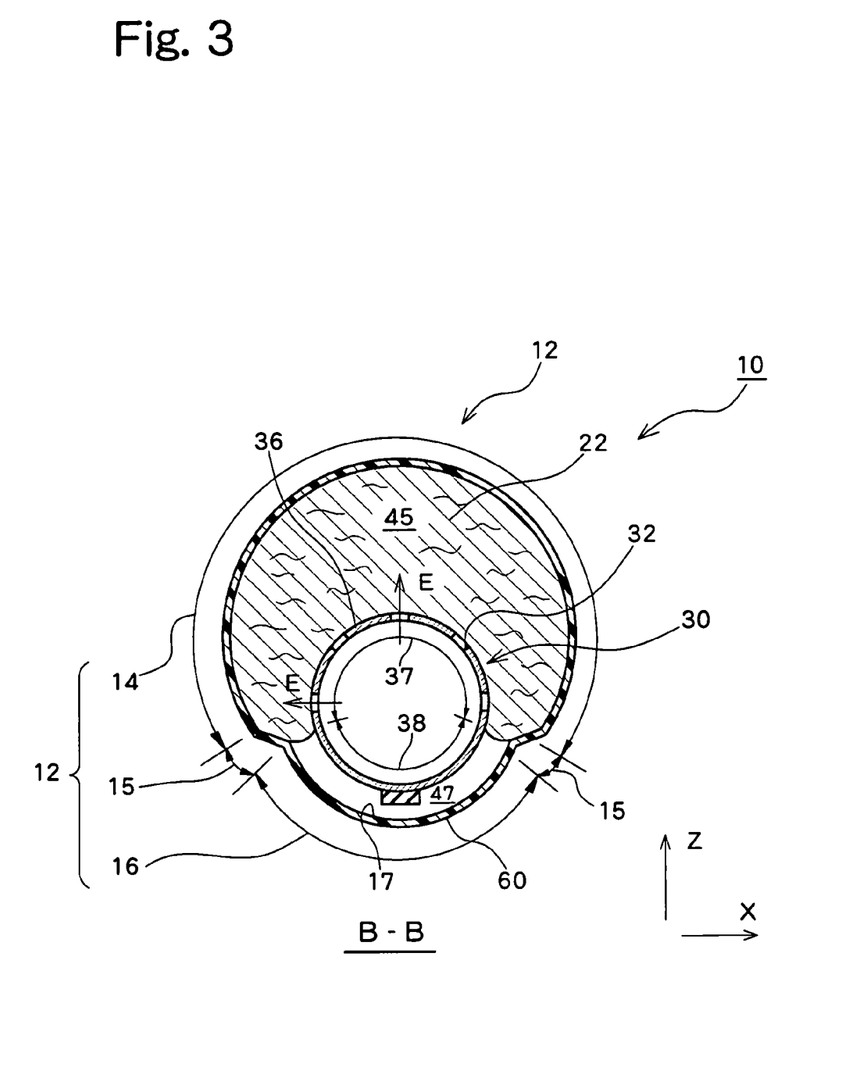
FIG. 3 is a sectional view taken along line B-B of FIG. 2.
Figure 4:
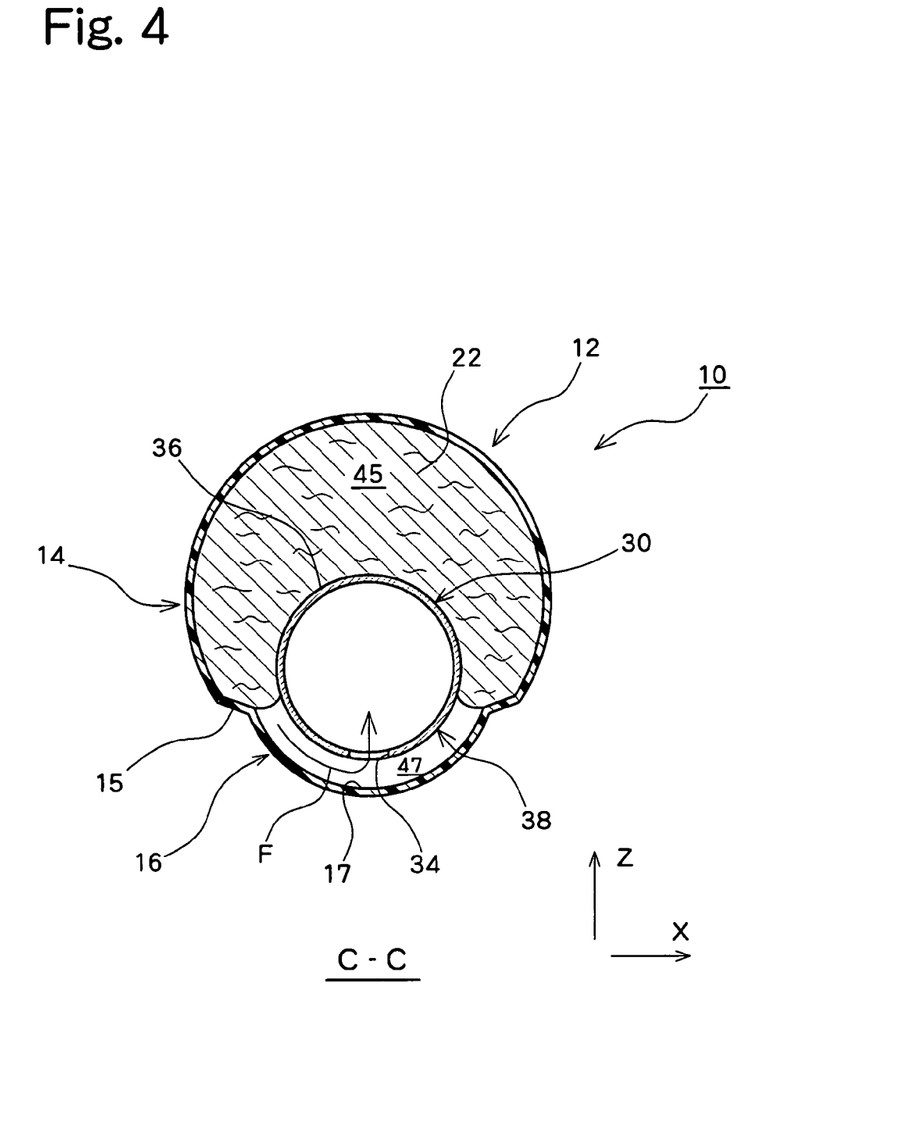
FIG. 4 is a sectional view taken along line C-C of FIG. 2.

Respective parts of the noise eliminator 10 of this embodiment will be described with reference to FIG. 2, FIG. 3 and FIG. 4. FIG. 2 is a longitudinal sectional view of the noise eliminator in the longitudinal direction (indicated by the arrow Y in FIG. 1). FIG. 3 is a sectional view taken along line B-B of FIG. 2, and FIG. 4 is a sectional view taken along line C-C of FIG. 2. The noise eliminator 10 includes an inner pipe 30 through which the exhaust passes, an outer shell 12 surrounding this, a sound absorption material 45 placed between the inner pipe 30 and the outer shell 12, a connection pipe 50 to connect the upstream side of the inner pipe 30 and the outer shell 12, and a buffer rubber member 60 to prevent contact between the inner pipe 30 and the outer shell 12 and to buffer load transmission. Hereinafter, the details of the noise eliminator 10 will be described with reference to FIG. 2 and FIG. 3. Incidentally, as an example, the noise eliminator 10 mounted in the exhaust system of the fuel-cell vehicle will be described, and the shapes and directions of the respective parts of the noise eliminator 10 will be set forth on the assumption that the noise eliminator 10 is mounted on the under floor at the rear of the vehicle.

As shown in FIG. 2 and FIG. 3, the inner pipe 30 is a pipe having a substantially circular section and made of stainless steel. A large number of sound transmitting holes 32 are formed as through circular holes with a diameter of about 3 mm in a peripheral wall 36 of the inner pipe 30. In the case where the noise eliminator 10 is mounted on the vehicle, the sound transmitting holes 32 are formed in an upper portion 37. The upper portion 37 includes an upper half in the vertical direction of the inner pipe 30. The upper portion 37 is also a part which is disposed to face the sound absorption material 45. As shown in FIG. 2, the sound transmitting holes 32 formed in the upper portion 37 are respectively disposed to have specified intervals, and the upper portion 37 has a net-like shape. Incidentally, in the inner pipe 30, a portion vertically lower than the upper portion 37 is defined as an inner pipe lower portion 38.

Besides, in the case where the noise eliminator 10 is mounted on the vehicle, the inner pipe 30 is disposed to become low in the exhaust system downstream direction with respect to the vehicle horizontal plane. The inner pipe 30 is disposed relative to the noise eliminator 10 so that water flowing into the lower portion 38 of the inner pipe 30 flows in the exhaust system downstream direction.

The exhaust containing water vapor passes through the inner pipe 30. The exhaust flows in the axial direction (direction indicated by the arrow D) of the inner pipe 30 from the exhaust system upstream side. Since this exhaust flow has specified variations in pressure transmitted from the exhaust system upstream side, as indicated by an arrow E in FIG. 3, a sound wave (pressure wave transmitted at the speed of sound) is radiated from the sound transmitting holes 32 of the inner pipe 30 to the sound absorption material 45 existing between the inner pipe and the outer shell 12. The sound wave incident on the sound absorption material 45 repeats scattering and interference in the sound absorption material 45 and is attenuated.

On the other hand, as shown in FIG. 2 and FIG. 3, the sound transmitting hole 32 is not formed in the lower portion 38 of the inner pipe 30. Water condensed at the exhaust system upstream side of the noise eliminator 10 is dropped by gravity, flows in the exhaust system downstream direction, and is collected in the inner pipe lower portion 38 of the noise eliminator 10. On the other hand, moisture in the form of water vapor in the exhaust flowing into the noise eliminator 10 is condensed into water on the inner wall 40 of the inner pipe 30, and is dropped by gravity to be collected in the lower portion 38 of the inner pipe 30.

The sound transmitting hole 32 is not formed in the inner pipe lower portion 38 which becomes lower in the exhaust system downstream direction. Thus, the water collected in the inner pipe lower portion 38 flows in the exhaust system downstream direction (direction indicated by the arrow Y in FIG. 2) along this. That is, the inner pipe lower portion 38 functions as "drainpipe" to allow water to flow.

An end 39 of the inner pipe 30 at the exhaust system downstream side is fixed to the outer shell 12. A water discharge hole 34 with a diameter of about 15 mm is formed at an immediately upstream side of the end 39 in the inner pipe lower portion 38.

As shown in FIG. 3, the outer shell 12 includes a reception section 14 which is formed with a specified interval from the inner pipe peripheral wall 36 so as to surround it, and holds the sound absorption material 45 between the outer shell and the inner pipe, and a water discharge section 16 which is provided to face the lower portion 38 of the inner pipe 30.

In the reception section 14 of the outer shell 12, the sound absorption material 45 is placed between the outer shell and the inner pipe 30. The reception section 14 is formed so as to hold the sound absorption material 45. The sound transmitting holes 32 are formed in the inner pipe peripheral wall 36 corresponding to the portion where the sound absorption material 45 is substantially placed. That is, the reception section 14 is provided to face the upper portion 37 of the inner pipe 30.

On the other hand, the water discharge section 16 is formed at the lower part in the vertical direction of the outer shell 12 so as to have a substantially U-shaped section protruding toward the outside in the diameter direction. A space 47 in which the sound absorption material 45 is not placed is formed between the water discharge section 16 and the inner pipe lower portion 38. The water discharge section 16 is formed, compared with a step section 15 of the outer shell 12 adjacent thereto, to have a specified depth downward in the vertical direction. As shown in FIG. 2, the water discharge section 16 and the space 47 having no sound absorption material 45 are formed over substantially the same length in the axial direction as the reception section 14 in which the sound absorption material 45 is placed. Besides, as shown in FIG. 2, the water discharge section 16 and the inner pipe 30 are disposed to be parallel to each other. That is, in the case where the noise eliminator 10 is mounted on the vehicle, the water discharge section 16 is disposed vertically to become low in the exhaust system downstream direction (direction indicated by the arrow Y).

In this way, the water discharge section 16 receives the water flowing through the sound transmitting holes 32 of the inner pipe 30, condensed and dropped between the inner pipe 30 and the outer shell 12, and allows this water to flow along the upper surface 17 toward the exhaust system downstream direction. The water flowing along the upper surface 17 of the water discharge section 16 toward the exhaust system downstream direction flows into the inner pipe 30 through the water discharge hole 34 as indicated by an arrow F in FIG. 4 and is discharged to the outside of the noise eliminator 10.

As shown in FIG. 3, in the vertical direction (direction indicated by the arrow Z), the reception section 14 of the outer shell 12 and the water discharge section 16 are formed such that the distance between the inner pipe peripheral wall 36 and the reception section 14 is larger than the distance between the inner pipe peripheral wall 36 and the water discharge section 16. That is, the inner pipe 30 is disposed to be offset and is closer to the water discharge section 16 side than to the reception section 14. Therefore, a relatively large space can be ensured between the upper side in the vertical direction of the inner pipe peripheral wall 36 and the reception section 14. A sufficient amount of the sound absorption material 45 can be placed in this space. In the noise eliminator 10, the space 47 in which the sound absorption material 45 is not placed is ensured between the water discharge section 16 and the inner pipe 30, and a large amount of the sound absorption material 45 can be placed on the upper side of the inner pipe 30, and therefore, both the water discharging performance and the noise eliminating performance can be attained without increasing the cross section of the outer shell 12.

Besides, the reception section 14 of the outer shell 12 and the water discharge section 16 are connected to each other through the step part 15 of the outer shell 12 as shown in FIG. 3. The gap between the inner pipe peripheral wall 36 and the step part 15 is set to become smaller toward the water discharge section 16 side. That is, the distance between the inner pipe peripheral wall 36 and the end of the step part 15 at the water discharge section 16 side is set to be extremely small compared with the distance between the inner pipe peripheral wall and the end of the step part 15 at the reception section 14 side.

In this way, when the sound absorption material 45 (for example, glass wool) is placed between the inner pipe 30 and the reception section 14 of the outer shell 12, the sound absorption material 45 is prevented from being placed to protrude from the reception section 14 to the water discharge section 16 side. Since the noise eliminator 10 includes the step part 15 as stated above, it becomes easier to place the sound absorption material 45 only in the inside of the reception section 14 of the outer shell 12.

Incidentally, in the noise eliminator 10 of this embodiment, although the structure is made such that the step section 15 is provided between the reception section 14 of the outer shell 12 and the water discharge section 16, the invention is not limited to this structure. When the sound absorption material does not protrude to the water discharge section, the structure may be made such that the step is not provided between the reception section and the water discharge section, and the section of the outer shell has a substantially circular shape. In this way, the manufacturing cost of the outer shell can be further reduced. Incidentally, when such a structure is adopted, the axial center of the inner pipe is disposed to be offset vertically downward relative to the axial center of the outer shell.

Besides, in the outer shell 12, in order to fix the inner pipe 30, as shown in FIG. 2, an inner pipe receiving section 18 is formed at the exhaust system downstream side, and a connection pipe receiving section 19 is formed at the exhaust system upstream side. The respective parts of the outer shell 12 are made of synthetic resin and are integrally molded by blow molding. Since the outer shell 12 can be constructed without using joining such as welding, it is possible to prevent a fluid in the outer shell 12 from leaking due to separation or the like of the joined portion.

The inner pipe receiving section 18 is formed to be substantially circular in accordance with the sectional shape of the inner pipe 30. The inner diameter of the receiving section 18 is set to be substantially the same as the outer diameter of the inner pipe 30 with a specified fitting gap. When the downstream side end 39 of the inner pipe 30 is put into the receiving section 18 of the outer shell 12 and is press-inserted, the inner pipe 30 is fixed to the outer shell 12. As a result, the inner pipe 30 can be fixed to the outer shell 12 without using a relatively high cost fixing method such as welding.

Incidentally, the inner pipe receiving section 18 may be provided not only at the exhaust system downstream side but also at the upstream side. In the case where the temperature of the noise eliminator 10 is changed, and the outer shell 12 and the inner pipe 30 are respectively expanded or contracted, when the structure is such that the strain can be absorbed, the inner pipe receiving section 18 may be provided at both the upstream side and the downstream side of the outer shell 12.

Figure 5:
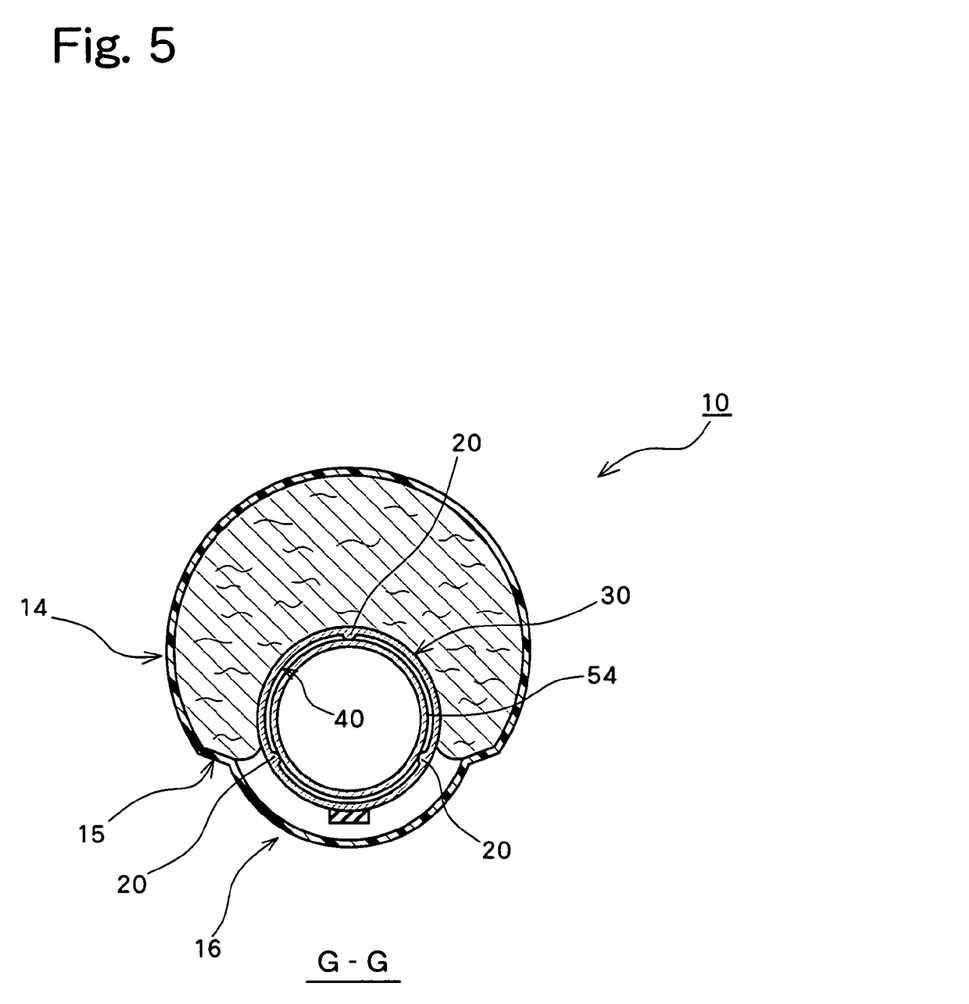
FIG. 5 is a sectional view taken along line G-G of FIG. 2 and is a view showing a state in which a connection pipe is inserted in an inner wall of an inner pipe.

On the other hand, at the opposite side to the inner pipe receiving section 18 of the outer shell 12, that is, at the exhaust system upstream side, as shown in FIG. 2, the connection pipe receiving section 19 is formed. The connection pipe 50 is press-inserted into and fixed to the connection pipe receiving section 19, so that the outer shell 12 and the inner pipe 30 are slidably fixed. Hereinafter, a description will be made with reference to FIG. 2 to FIG. 5. FIG. 5 is a sectional view taken along line G-G of FIG. 2 and shows a state in which the connection pipe 50 is inserted in the inner wall 40 of the inner pipe 30.

As shown in FIG. 2, the connection pipe 50 is made of metal, and includes a large diameter section 52 press-inserted in an inner wall 41 of the connection pipe receiving section 19 of the outer shell 12 and a small diameter section 54 slidably held to the inner wall 40 of the inner pipe 30. A sliding projection 20 as shown in FIG. 5 is formed at a part into which the small diameter section 54 of the inner pipe 30 is pressed. In the state in which the inner pipe 30 is fixed to the inner pipe receiving section 18 of the outer shell 12, when the connection pipe 50 is inserted in the inner direction (direction indicated by the arrow D in FIG. 2) from the outside of the noise eliminator 10, the large diameter section 52 is press-inserted into the connection pipe receiving section 19 of the outer shell 12, and the small diameter section 54 is fitted into the inner wall 40 of the inner pipe 30. The small diameter section 54 of the connection pipe 50 comes in point contact with the sliding projection 20 provided on the inner pipe inner wall 40. Since the area of the contact part is small, the inner pipe 30 can slide in the axial direction (direction indicated by the arrow D in FIG. 2) with respect to the connection pipe 50.

As a result, for example, in the case where the temperature of the noise eliminator 10 rises, and the outer shell 12 made of resin and the inner pipe 30 made of stainless steel are respectively expanded with different thermal expansion coefficients in the axial direction (direction indicated by the arrow D), the small diameter section 54 of the connection pipe 50 and the inner wall 40 of the inner pipe 30 slide on each other in the axial direction, so that the difference in the thermal expansion coefficient between the outer shell 12 and the inner pipe 30 can be absorbed. As a result, the noise eliminator 10 can be constructed using different members, such as the outer shell 12 made of resin and the inner pipe 30 made of metal.

The buffering rubber member 60 to prevent contact with the outer shell 12 is provided on the lower side of the inner pipe 30. The buffering rubber member 60 is disposed on the lower side of the inner pipe peripheral wall 36 in the vertical direction, and is extended in the axial direction of the inner pipe as shown in FIG. 2. In this way, in the case where the inner pipe 30 slides in the outer shell 12, it is possible to prevent the water discharge section 16 of the outer shell and the inner pipe 30 from coming in direct contact with each other to generate an abnormal noise. Besides, it is also possible to prevent the inner pipe 30 from approaching the water discharge section 16 due to a variation in assembly of the outer shell 12 and the inner pipe 30 or thermal expansion to make the space 47 formed above the water discharge section 16 extremely narrow.

Figure 6:
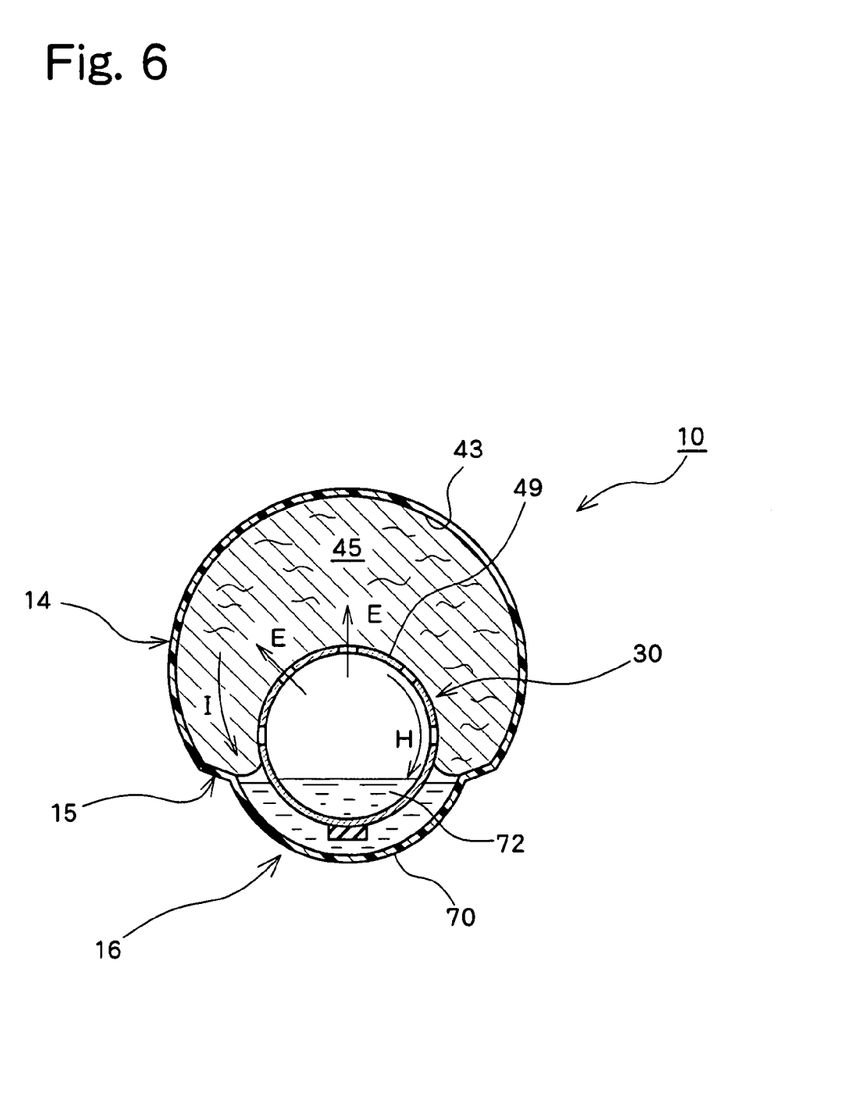
FIG. 6 is a sectional view taken along line B-B of FIG. 2 and is a view showing a state in which water flows through a lower portion of the inner pipe and a water discharge section.

The structure of the noise eliminator 10 of the embodiment has been described. Hereinafter, the flow of moisture in the exhaust of the noise eliminator 10 of the embodiment and the flow of water generated by condensation of the moisture will be described with reference to FIG. 2, FIG. 4 and FIG. 6. FIG. 6 is a sectional view taken along line B-B of FIG. 2 similarly to FIG. 3, and shows a state in which water flows through the inner pipe lower portion 38 and the water discharge section 16.

First, as shown in FIG. 2, exhaust containing moisture flows into the connection pipe 50 of the noise eliminator 10 from the exhaust system upstream side. Together with this, water condensed at the exhaust system upstream side also flows into it from the exhaust system upstream side along the lower side of the peripheral wall 56 of the connection pipe.

As shown by the arrow E in FIG. 6, the exhaust flowing into the inner pipe 30 from the connection pipe 50 radiates a sound wave from the sound transmitting holes 32 of the inner pipe 30 to the sound absorption material 45, and the exhaust, although its amount is small, flows into the sound absorption material 45, that is, a sound absorption chamber 22 formed between the reception section 14 of the outer shell and the inner pipe 30. The small amount of the exhaust flowing into the sound absorption chamber 22 is condensed at the sound absorption material 45, the inner wall 43 of the outer shell 12, and the outer wall 49 of the inner pipe 30, becomes water and is attached. As shown by an arrow I in FIG. 6, this water is dropped to the water discharge section 16 of the outer shell 12 existing at the lower part in the vertical direction by gravity and vibration of the vehicle.

The water discharge section 16 receives the dropped water and temporarily stores it. The sound absorption material 45 is not placed in the space 47 between the water discharge section 16 and the lower portion 38 of the inner pipe 30. Even in the case where the water discharge section 16 receives the water flowing into the outer shell 12, and the water is stored here, since the sound absorption material 45 is not placed in the water discharge section 16, the sound absorption material 45 inside the noise eliminator 10 does not absorb the water and does not contain it. Accordingly, it is possible to prevent a region containing water in the sound absorption material 45 from expanding due to the capillarity. The sound absorption material 45 can exhibit specified sound absorption performance and the noise eliminator 10 can prevent specified noise elimination performance from lowering.

Besides, the water discharge section 16 is formed into the U shape protruding to the outside of the outer shell 12 and is deep to the lower side in the vertical direction as compared with the step section 15 of the outer shell 12 adjacent thereto. Thus, the water discharge section 16 can temporarily store more water while preventing the water from coming in contact with the surrounding sound absorption material 45. Thus, even in the case where the operating rate of the fuel cell is relatively high, and the amount of water dropped from the sound absorption chamber 22 is relatively large, the water can be temporarily stored in the water discharge section 16 and can be discharged to the outside of the outer shell 12 without allowing the water stored in the water discharge section 16 to come in contact with the sound absorption material 45 at the periphery of the water discharge section 16.

Then, the water discharge section 16 allows water 70 stored here to flow in the exhaust system downstream direction. As stated above, in the case where the noise eliminator 10 is mounted on the vehicle, the water discharge section 16 is disposed to become lower in the exhaust system downstream direction. Thus, the water discharge section 16 can allow this water 70 to flow along the upper surface 17 of the water discharge section 16 in the exhaust system downstream direction. The water 70 flowing along the water discharge section 16 in the exhaust system downstream direction reaches the water discharge hole 34 of the inner pipe 30.

On the other hand, on the inner wall 40 of the inner pipe 30, moisture in the exhaust is condensed to become water and is dropped to the lower portion 38 of the inner pipe peripheral wall 36 as shown by an arrow H in FIG. 6. The water dropped from the inner wall 40 of the inner pipe joins water flowing along the lower side of the peripheral wall 56 of the connection pipe. Similarly to the water discharge section 16, in the case where the noise eliminator 10 is mounted on the vehicle, the inner pipe 30 is also disposed to become lower in the downstream direction. Thus, this joined water 72 flows along the inner pipe lower portion 38 and reaches the water discharge hole 34.

The water 70 flowing along the water discharge section 16 in the exhaust system downstream direction and the water 72 flowing along the lower portion 38 of the inner pipe 30 join together in the water discharge hole 34, and are discharged from the end 39 of the inner pipe 30 to the outside of the noise eliminator 10, that is, the outside of the exhaust system.

In the noise eliminator 10 of this embodiment described above, even if the water discharge section 16 receives the water flowing into the outer shell 12, since the sound absorption material 45 is not placed in the water discharge section 16, the sound absorption material 45 does not absorb the water from the water discharge section 16 by the capillarity and does not contain water. Accordingly, according to the noise eliminator 10 of the embodiment, the region where the sound absorption material 45 contains water can be made narrower. Since the sound absorption material 45 in the noise eliminator 10 can exhibit the specified sound absorption performance, the specified noise eliminating performance of the noise eliminator 10 is not lowered.

The invention claimed is:

1. A noise eliminator for a fuel cell provided in an exhaust system to discharge exhaust from a fuel cell, comprising:
   an inner pipe made of metal, which has a peripheral wall formed with a plurality of sound transmitting holes and through which the exhaust flows in an axial direction; and
   an outer shell made of resin, which is formed to surround the inner pipe with a specified interval from the peripheral wall, wherein
   the outer shell includes
   a reception section in which a sound absorption material is placed between the outer shell and the inner pipe,
   a water discharge section which is positioned to face a lower portion in the vertical direction of the inner pipe and in which the sound absorption material is not placed between the outer shell and the inner pipe,
   a first pipe receiving section positioned on an exhaust system downstream side of the outer shell, and
   a second pipe receiving section positioned on an exhaust system upstream side of the outer shell, those are integrally molded,
   one end of the inner pipe is press-inserted into the first pipe receiving section of the outer shell and is fixed, and one end of a connection pipe made of metal is press-inserted into the second pipe receiving section of the outer shell and is fixed, and
   the other end of the connection pipe is slidably fitted in the other end of the inner pipe, wherein a first distance, taken between the inner pipe peripheral wall and the reception section, is larger than a second distance, taken between the inner pipe peripheral wall and the water discharge section, and wherein the outer shell includes a step portion to make the diameter of the outer shell smaller on the water discharge section side.

2. The noise eliminator for the fuel cell according to claim 1, wherein the inner pipe is disposed relative to the outer shell so that a distance in the vertical direction between the peripheral wall of the inner pipe and the reception section of the outer shell is larger than a distance between the peripheral wall and the water discharge section of the outer shell.

3. The noise eliminator for the fuel cell according to claim 2, wherein the water discharge section of the outer shell is formed to have a substantially U-shaped section protruding toward the outside of the outer shell.

4. The noise eliminator for the fuel cell according to claim 2, wherein the sound transmitting holes are formed in an upper portion of the peripheral wall of the inner pipe and are not formed in a lower portion.

5. The noise eliminator for the fuel cell according to claim 4, wherein the sound transmitting hole is formed in a portion of the inner pipe peripheral wall facing a sound absorption chamber formed between the outer shell reception section and the inner pipe.

6. The noise eliminator of for the fuel cell according to claim 2, wherein the noise eliminator is mounted at an inclination angle with respect to a horizontal plane of the vehicle, such that an end of the noise eliminator becomes lower in an exhaust system downstream direction.

7. The noise eliminator for the fuel cell according to claim 6, wherein the inclination angle is 5° to 10°.

8. The noise eliminator for the fuel cell according to claim 6, wherein a water discharge hole to connect a space between the outer shell water discharge section and the inner pipe and an inside of the inner pipe is formed in the lower portion of the inner pipe at an exhaust system downstream side.

9. The noise eliminator for the fuel cell according to claim 2, wherein a buffer member is provided between the inner pipe and the outer shell to prevent contact therebetween.

10. The noise eliminator for the fuel cell according to claim 9, wherein the buffer member protrudes from the lower side in the vertical direction of the inner pipe peripheral wall, and is extended along the axial direction of the inner pipe.

11. The noise eliminator for the fuel cell according to claim 1 further comprising a connection pipe which includes a large diameter section press-inserted into and fixed to the second pipe receiving section of the outer shell, and a small diameter section slidably fitted in the other end of the inner pipe, and the outer shell and the other end of the inner pipe are connected.

* * * * *